United States Patent
Morino et al.

(10) Patent No.: US 8,558,875 B2
(45) Date of Patent: Oct. 15, 2013

(54) VIDEO SIGNAL PROCESSING DEVICE

(75) Inventors: Hideki Morino, Osaka (JP); Ryuichi Shibutani, Osaka (JP); Haruko Terai, Osaka (JP); Nobutoshi Fujinami, Osaka (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/989,460

(22) PCT Filed: Sep. 28, 2009

(86) PCT No.: PCT/JP2009/004902
§ 371 (c)(1),
(2), (4) Date: Oct. 25, 2010

(87) PCT Pub. No.: WO2010/035486
PCT Pub. Date: Jan. 4, 2010

(65) Prior Publication Data
US 2011/0037835 A1   Feb. 17, 2011

(30) Foreign Application Priority Data
Sep. 29, 2008   (JP) .................. 2008-250155

(51) Int. Cl.
H04N 13/00 (2006.01)
H04N 13/02 (2006.01)
H04N 13/04 (2006.01)

(52) U.S. Cl.
USPC ............... 348/51; 348/42; 348/43; 348/46; 348/47

(58) Field of Classification Search
USPC ............... 348/51, 42, 43, 46, 47
See application file for complete search history.

(56) References Cited

U.S. PATENT DOCUMENTS

| 6,983,016 B2 * | 1/2006 | Hourunranta ............. 375/240.12 |
| 7,139,424 B2 * | 11/2006 | Sogawa ...................... 382/154 |
| 7,876,973 B2 * | 1/2011 | Fairbanks et al. .......... 382/263 |
| 2009/0028249 A1 | 1/2009 | Gomila et al. |

FOREIGN PATENT DOCUMENTS

| JP | 7-322302 | 12/1995 |
| JP | 8-047002 | 2/1996 |
| JP | 2000-341558 | 12/2000 |

(Continued)

OTHER PUBLICATIONS

Extended Supplementary European Search Report issued Feb. 15, 2012 in European Application No. 09 815 908.0.

(Continued)

*Primary Examiner* — Geepy Pe
(74) *Attorney, Agent, or Firm* — Wenderoth, Lind & Ponack, L.L.P.

(57) ABSTRACT

The video signal processing device has a parallax detection unit for detecting the parallax between a right-eye video signal and a left-eye video signal and outputting the detected parallax as a parallax detection signal. The video signal processing device has an encoding noise detection unit for detecting an encoding noise generated by encoding processing, outputting an encoding noise detection signal corrected by using a detection result of the detected encoding noise based on the parallax detection signal. The video signal processing device has an encoding noise removing unit for performing at least one of reducing the encoding noise by filtering processing using the encoding noise detection signal, and reducing, based on the parallax detection signal, the encoding noise by replacing the data of a noise generating pixel in the right-eye video signal and the left-eye video signal.

10 Claims, 7 Drawing Sheets

(56) References Cited

FOREIGN PATENT DOCUMENTS

| JP | 2002-262310 | 9/2002 |
| JP | 2003-319419 | 11/2003 |
| WO | 2007/081838 | 7/2007 |

OTHER PUBLICATIONS

Daniel Scharstein, "View Synthesis Using Stereo Vision", Cornell University, Doctor of Philosophy, Jan. 31, 1997, XP002646724, Cornell University, Retrieved from the Internet on Jun. 29, 2011: URL: http://ecommons.library.cornell.edu/handle/1813/7259.

Gary J. Sullivan et al., "Video Compression-From Concepts to the H.264/AVC Standard", Proceedings of the IEEE, IEEE. New York, U.S., vol. 93, No. 1, Jan. 1, 2005, pp. 18-31, XP011123850; ISSN: 0018-9219, DOI: 10.1109/JPROC.2004.839617.

Peter List et al., "Adaptive Deblocking Filter", IEEE Transactions on Circuits and Systems for Video Technology, IEEE Service Center, Piscataway, NJ, U.S., vol. 13, No. 7, Jul. 1, 2003, pp. 614-619, XP011099254, ISSN:1051-8215, DOI: 10.1109/TCSVT.2003. 815175.

International Search Report issued Oct. 27, 2009 in International (PCT) Application No. PCT/JP2009/004902.

* cited by examiner

FIG. 7D
PRIOR ART

VIDEO SIGNAL PROCESSING DEVICE

This application is a U.S. national phase application of PCT International Application PCT/JP2009/004902, filed Sep. 28, 2009.

TECHNICAL FIELD

The present invention relates to video signal processing that uses parallax between right-eye video and left-eye video when three-dimensional stereoscopic display is performed to allow reduction of encoding noise generated by encoding processing such as an MPEG (motion picture experts group) 2 system or an MPEG4-AVC (advanced visual communication)/H.264 system.

BACKGROUND ART

Various methods for achieving three-dimensional stereoscopic display in a video display device have been studied. A method of preparing right-eye video and left-eye video of a subject, providing a mechanism of making the right eye and the left eye see them, respectively, and performing stereoscopic vision of the subject is well known. When a person sees something with the eyes, generally, parallax occurs between the image seen by the right eye and the image seen by the left eye even if the person sees the same subject. This parallax allows the person to stereoscopically recognize the seen subject and feel the depth of the subject. Therefore, by preparing a right-eye video signal and a left-eye video signal having the parallax, a video display device capable of stereoscopically viewing the subject is achieved.

Next, the parallax between the right-eye video and the left-eye video is described. For example, as the subject in the right-eye video is shifted to the left side and the subject in the left-eye video is shifted to the right side, a person seeing the videos feels as if the subject projects to the front side. Conversely, as the subject in the right-eye video is shifted to the right side and the subject in the left-eye video is shifted to the left side, a person seeing the videos feels as if the subject is recessed to the depth side. When there is no parallax and the right-eye video is the same as the left-eye video, it looks as if the subject exists at a position of the display surface of the video display device. The videos having such parallax allowing stereoscopic vision can be easily acquired by photographing the subject with two same cameras arranged horizontally in parallel. At this time, generally, a right-eye camera is disposed on the right side and a left-eye camera is disposed on the left side.

Various systems have been proposed as a video display device for three-dimensional stereoscopic vision. For example, in an active shutter system, the right-eye video and the left-eye video are sequentially arranged and displayed in time sequence. When shutter eyeglasses are used where the right-eye lens and the left-eye lens are opened or closed in response to the right-eye video and the left-eye video, respectively, the right-eye video is seen only by the right eye and the left-eye video is seen only by the left eye. This allows stereoscopic vision of the subject (patent literature 1).

When a video signal for stereoscopically viewing a subject is transmitted, a right-eye video signal and a left-eye video signal need to be transmitted individually. Therefore, when the right-eye video signal and left-eye video signal are transmitted as they are, the transmission rate is twice that in a usual case.

Figure 7A:
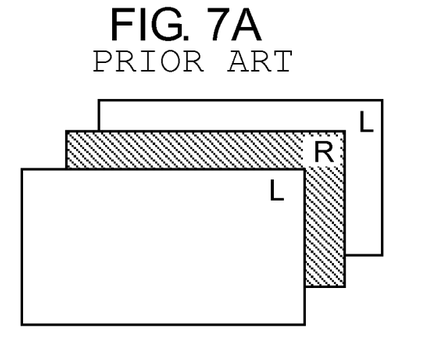
FIG. 7A is a diagram showing a transmission format in conventional three-dimensional stereoscopic display.

For example, in a field sequential system shown in FIG. 7A, left-eye video L and right-eye video R are arranged in time sequence for each frame and are transmitted. In this system, a signal where neither vertical resolution nor horizontal resolution does not degrade is acquired when stereoscopic vision is not performed, namely when two-dimensional display is performed. However, the transmission rate is twice that in the usual case.

Figure 7B:
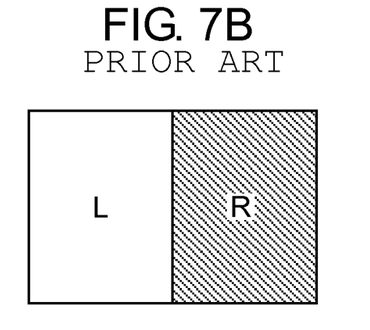
FIG. 7B is a diagram showing another transmission format in conventional three-dimensional stereoscopic display.
Figure 7C:
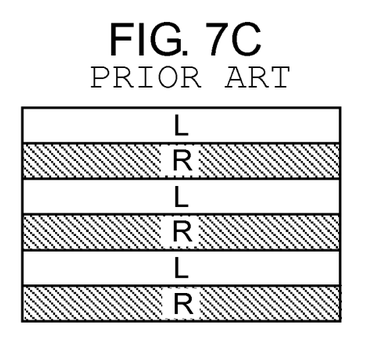
FIG. 7C is a diagram showing yet another transmission format in conventional three-dimensional stereoscopic display.
Figure 7D:
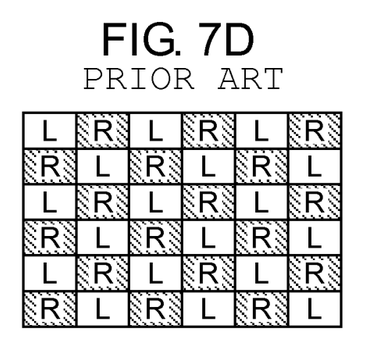
FIG. 7D is a diagram showing still another transmission format in conventional three-dimensional stereoscopic display.

For suppressing the transmission rate, several types of systems shown in FIG. 7B, FIG. 7C, and FIG. 7D are disclosed. In a side-by-side system shown in FIG. 7B, right-eye video R and left-eye video L with a horizontal resolution of ½ are transmitted while being arranged in a right half and a left half of one frame. In this system, however, the horizontal resolution degrades. In a vertical interleave system shown in FIG. 7C, left-eye videos L and right-eye videos R are vertically transmitted in a multiple manner for each line. In this system, however, the vertical resolution degrades. In a checker pattern system shown in FIG. 7D, right-eye videos R and left-eye videos L are transmitted while being arranged in a zigzag pattern for each pixel. In this system, however, both the vertical resolution and horizontal resolution degrade.

Video signals to be transmitted in such systems are encoding-processed by an MPEG2 encoding system or MPEG4-AVC/H.264 encoding system used for recent digital broadcasting, and then transmitted or recorded in an accumulation medium. Thanks to the encoding processing, the transmitting efficiency can be improved by compressing data amount. However, the encoding processing generates an encoding noise accompanying the compression processing, and also causes image quality reduction. The encoding noise includes a block noise that is generated in a boundary between blocks by performing a series of encoding processings block by block, and a ringing noise (also called mosquito noise) that is generated by quantization processing. Conventionally, a method of detecting these encoding noises and reducing the noises by filtering processing is proposed (patent literature 2).

In such a method, a noise is extracted from a video signal with a high pass filter (hereinafter referred to as "HPF") and a band path filter (hereinafter referred to as "BPF"). However, actually, the noise is often difficult to be distinguished from a picture in the video signal and false detection is often caused, so that a side effect that the picture is blurred by filtering processing is produced. The noise reducing effect is difficult to be produced dependently on the characteristic of the filter, disadvantageously.

In the conventional art, in reducing the encoding noise such as a block noise or ringing noise that occurs when the video signal of three-dimensional stereoscopic display is encoding-processed by the MPEG2 and H.264, the noise is actually difficult to be distinguished from the picture in the video and false detection often occurs. As a result, the filtering processing for noise reduction blurs the picture or the noise reducing effect is difficult to be produced dependently on the characteristic of the filter, disadvantageously.

CITATION LIST

[Patent Literature]
[Patent Literature 1] Unexamined Japanese Patent Publication No. 2002-262310
[Patent Literature 2] Unexamined Japanese Patent Publication No. 2000-341558

SUMMARY OF THE INVENTION

A video signal processing device of the present invention has a parallax detection unit, an encoding noise detection unit, and an encoding noise removing unit, in a stereoscopic image display device for displaying a stereoscopic image with a right-eye video signal and left-eye video signal having parallax. The parallax detection unit detects the parallax from the right-eye video signal and left-eye video signal that are acquired by decoding a video signal encoded such as the MPEG2 encoding system or MPEG4-AVC/H.264 encoding system, and outputs the detected parallax as a parallax detection signal. The encoding noise detection unit detects an encoding noise that is generated by encoding processing from the right-eye video signal and left-eye video signal, outputs an encoding noise detection signal corrected by using a detection result of the detected encoding noise based on the parallax detection signal. The encoding noise removing unit performs at least one of the followings: reducing the encoding noise from the right-eye video signal and left-eye video signal by the filtering processing using the encoding noise detection signal; and reducing, based on the parallax detection signal, the encoding noise by replacing the data of a noise generating pixel in the right-eye video signal and left-eye video signal with the corresponding pixel data in the other video that shifts by the parallax and contains no noise.

In this configuration, the parallax between the right-eye video signal and left-eye video signal is detected, and is used for encoding noise detection and noise removing processing. Thus, the accuracy of encoding noise detection is improved and the adverse effect that the picture is blurred by the filtering processing is reduced.

A video signal processing method of the present invention has a parallax detection step, an encoding noise detection step, and an encoding noise removing step, in a stereoscopic image display device for displaying a stereoscopic image with a right-eye video signal and left-eye video signal having parallax. In the parallax detection step, the parallax detection unit performs the following processes:

detecting the parallax from the right-eye video signal and left-eye video signal that are acquired by decoding a video signal encoded such as the MPEG2 encoding system or MPEG4-AVC/H.264 encoding system; and outputting the detected parallax as a parallax detection signal.

In the encoding noise detection step, the encoding noise unit performs the following processes:

detecting encoding noise generated from the right-eye video signal and left-eye video signal by encoding processing; and outputting an encoding noise detection signal corrected by using a detection result of the detected encoding noise based on the parallax detection signal;

outputting the encoding noise detection signal.

In the encoding noise removing step, the encoding noise removing unit performs at least one of the following processes:

reducing the encoding noise from the right-eye video signal and left-eye video signal by the filtering processing using the encoding noise detection signal; and reducing, based on the parallax detection signal, the encoding noise by replacing the data of a noise generating pixel in the right-eye video signal and left-eye video signal with the corresponding pixel data in the other video that shifts by the parallax and contains no noise.

DETAILED DESCRIPTION OF PREFERRED EMBODIMENTS (Exemplary Embodiment)

Figure 1:
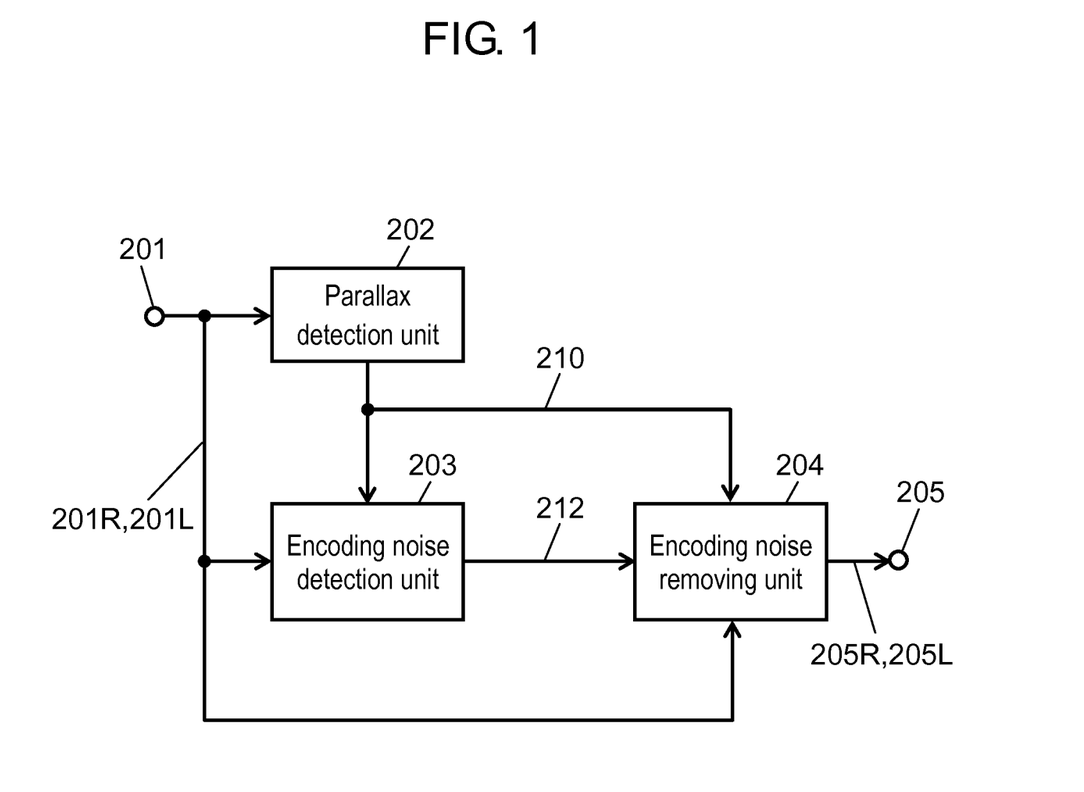
FIG. 1 is a block diagram showing a configuration of a video signal processing device in accordance with an exemplary embodiment of the present invention.

FIG. 1 is a block diagram showing a configuration of a video signal processing device in accordance with an exemplary embodiment of the present invention. An exemplary embodiment of the present invention will be described hereinafter with reference to the following drawings. As shown in FIG. 1, the video signal processing device of the present exemplary embodiment includes parallax detection unit 202 having video signal input terminal 201, encoding noise detection unit 203, and encoding noise removing unit 204 having video signal output terminal 205. Video signal input terminal 201 receives right-eye video signal 201R and left-eye video signal 201L that are acquired by decoding a signal encoded such as the MPEG2 encoding system or MPEG4-AVC/H.264 encoding system. Video signal output terminal 205 outputs right-eye video signal 205R and left-eye video signal 205L signal-processed by the video signal processing device.

Parallax detection unit 202 receives right-eye video signal 201R and left-eye video signal 201L. Parallax detection unit 202 detects the parallax between right-eye video signal 201R and left-eye video signal 201L, and outputs the detected parallax as parallax detection signal 210. Encoding noise detection unit 203 receives right-eye video signal 201R and left-eye video signal 201L, and detects an encoding noise such as a block noise or ringing noise. Encoding noise detection unit 203, using parallax detection signal 210, corrects the detection result of the encoding noise so as to reduce the detected encoding noise. Here, parallax detection signal 210 is the parallax detection result between right-eye video signal 201R and left-eye video signal 201L detected by parallax detection unit 202. Then, encoding noise detection unit 203 outputs the corrected detection result as encoding noise detection signal 212. This correcting method is described in detail later.

Encoding noise removing unit 204 reduces the encoding noise from right-eye video signal 201R and left-eye video signal 201L by the filtering processing using encoding noise detection signal 212 output from encoding noise detection unit 203. Encoding noise removing unit 204, using parallax detection signal 210 output from parallax detection unit 202, reduces the noise by replacing the data of a noise generating pixel in one of right-eye video signal 201R and left-eye video signal 201L with the corresponding pixel data in the other video signal that shifts by the parallax and contains no noise.

Figure 2:
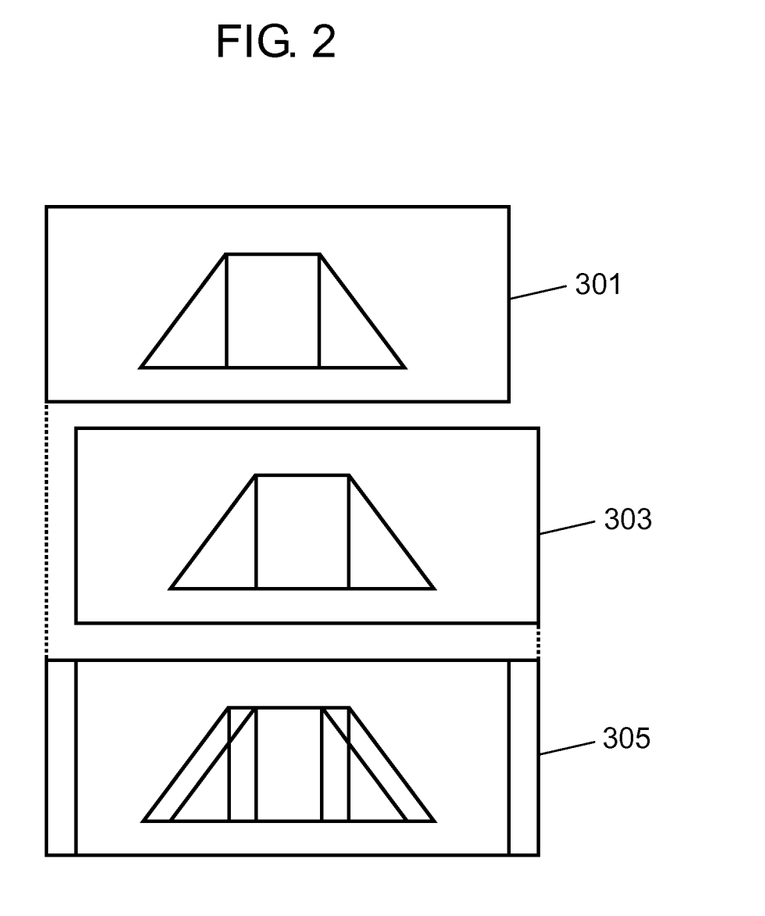
FIG. 2 is a diagram showing input and display of a video signal in accordance with the exemplary embodiment of the present invention.

Operation of the video signal processing device is described hereinafter using a specific example. Right-eye video signal 201R and left-eye video signal 201L are assumed to be video signals displayed as display video 305 shown in FIG. 2 on a display device, for example. Right-eye video 301 and left-eye video 303 corresponding to it show trapezoidal objects (constituted by triangles and a quadrangle) having parallax. In the relationship between right-eye video 301 and left-eye video 303, left-eye video 303 is shifted to the right from right-eye video 301 as shown in FIG. 2. When these videos are projected on the display device and seen without using eyeglasses for stereoscopic vision, it looks as if right-eye video 301 and left-eye video 303 overlap each other as display video 305 of FIG. 2.

Right-eye video signal 201R and left-eye video signal 201L displayed as discussed above are encoded such as the MPEG2 encoding system or MPEG4-AVC/H.264 encoding system, and a video signal acquired by decoding the encoded signals is input to video signal input terminal 201. In this case, the decoding processing can generate a block noise or a ringing noise (also called mosquito noise) in right-eye video signal 201R and left-eye video signal 201L as the input video signal. When compression ratio is large, namely when the bit rate decreases, these noises are apt to occur and be recognized.

Figure 3A:
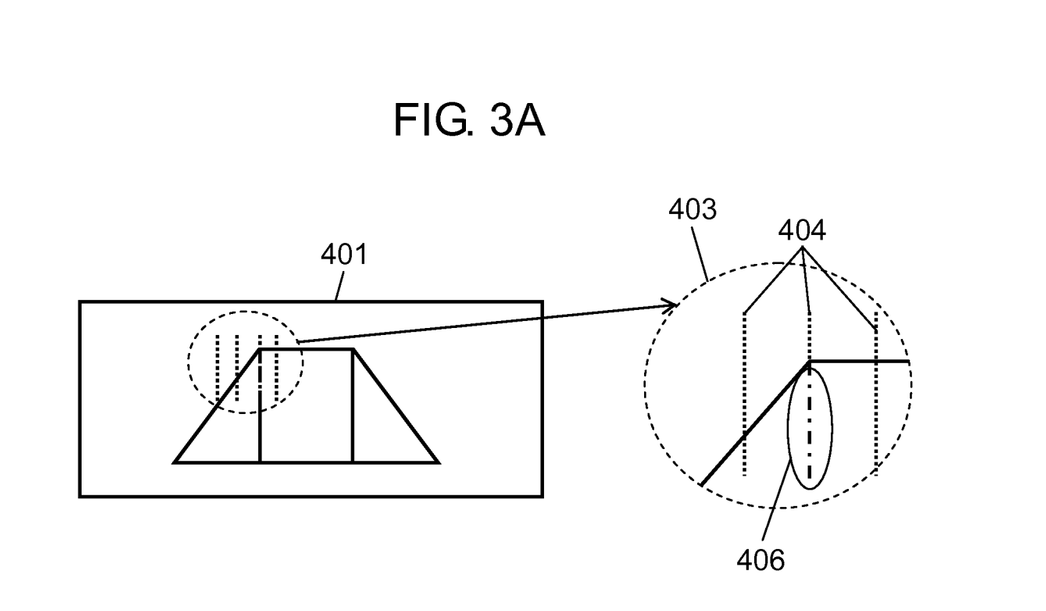
FIG. 3A is a diagram showing a block noise in accordance with the exemplary embodiment of the present invention.
Figure 3B:
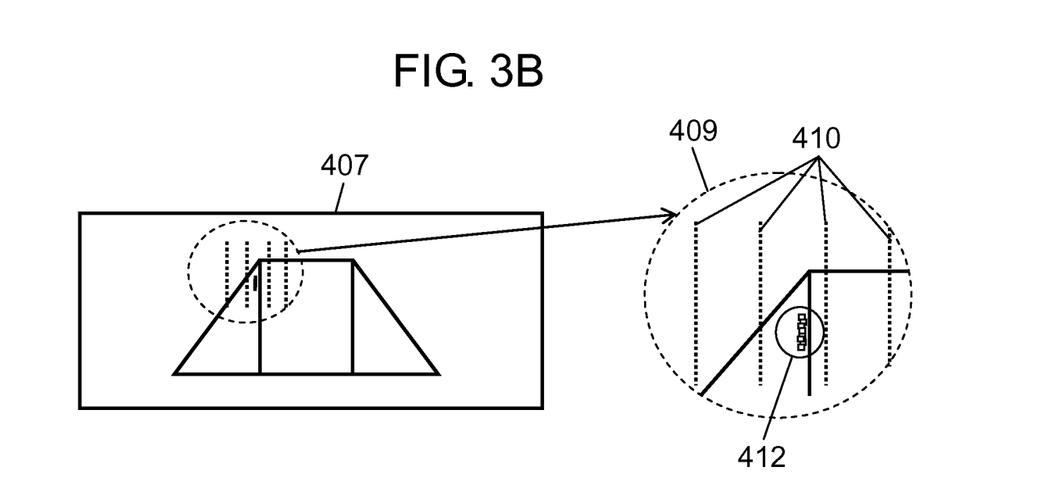
FIG. 3B is a diagram showing a ringing noise in accordance with the exemplary embodiment of the present invention.

Here, the case is assumed that decoding processing of a video signal corresponding to display video 305 of FIG. 2 generates block noise 406 or ringing noise 412 in right-eye video 401 and left-eye video 407 as shown in FIG. 3, for example. It is assumed that above mentioned right-eye video signal 201R and left-eye video signal 201L are input to video signal input terminal 201. FIG. 3 shows block noise 406 included in right-eye video 401 and ringing noise 412 included in left-eye video 407, for example. FIG. 3 also shows block boundaries 404 and 410 in respective videos. In FIG. 3, block noise generating region 403 and ringing noise generating region 409 as part of right-eye video 401 and left-eye video 407 are partially enlarged.

Here, specific operation of each block shown in FIG. 1 is described in detail using FIG. 3.

First, parallax detection unit 202 detects the parallax between right-eye video signal 201R and left-eye video signal 201L. Various methods of detecting the parallax are considered. For example, parallax detection unit 202 obtains difference between a target pixel of right-eye video signal 201R and a pixel existing at the same position of left-eye video signal 201L and a pixel existing in its periphery. Parallax detection unit 202 determines that the pixel where the absolute value of the difference is the smallest is a pixel having a correlation, namely a pixel shifted by parallax distance. Parallax detection unit 202 outputs, as parallax detection signal 210, the direction and distance between the target pixel and the pixel shifted by the parallax distance.

When the parallax is large, parallax detection unit 202 needs to enlarge the range of the target pixel of which difference from right-eye video signal 201R and left-eye video signal 201L is obtained. In order to improve the detection accuracy, parallax detection unit 202 may determine the parallax detection result where the number of pixels having the same detection result is the largest as the detection result of the target pixel, using also the detection result of a plurality of pixels existing around the target pixel. The reason why this method is used is that the parallax between right-eye video signal 201R and left-eye video signal 201L often becomes the same in a some comprehensive range including the peripheral pixels. Especially, when an encoding noise occurs, the noise can disturb correct determination of the correlation. Therefore, parallax detection unit 202 can improve the detection accuracy by performing detection while the detection range is enlarged up to the peripheral pixels of the target pixel. Parallax detection unit 202 may suppress the influence of the noise by removing the noise component with a low pass filter (hereinafter referred to as "LPF") and a BPF before obtaining the difference. Here, parallax detection signal 210 includes the direction and distance on the display screen, namely is a vector. For parallax detection, the target pixel may be set in either of right-eye video signal 201R and left-eye video signal 201L.

Next, encoding noise detection unit 203 firstly detects block noise 406 and ringing noise 412 (also called mosquito noise) generated by encoding processing for right-eye video signal 201R and left-eye video signal 201L. For detecting these noises, various detecting methods are considered.

When block noise 406 is detected, for example, the video signal is decoded with a decoder for each block of video signals as a processing unit. Therefore, encoding noise detection unit 203 may use block boundary 404 of the video signal. In other words, encoding noise detection unit 203 compares the boundary information between the blocks with right-eye video signal 201R and left-eye video signal 201L. Encoding noise detection unit 203 checks the continuity of the edge (contour), flatness, and signal level of a picture near block boundary 404, and detects the plurality of pixels as block noise 406 when at least one pixel of the plurality of pixels between which block boundary 404 is sandwiched is separate.

Specifically, encoding noise detection unit 203 extracts signal components of the edge (contour) with an HPF of the spatial direction, for example. Encoding noise detection unit 203 compares the edge with the signal components extracted from the peripheral pixels of block boundary 404 with the HPF of the spatial direction, and compares the level difference between the signal components with a threshold. When the level difference is larger than the threshold, it is assumed that there is no correlation between the signal components. Here, the threshold needs to be set in response to the encoding bit rate and image contents. Therefore, encoding noise detection unit 203 determines that, when there is no correlation between the signal components as discussed above, the image is discontinuous and block noise 406 occurs. In other words, encoding noise detection unit 203 may extract, with the HPF of the spatial direction, from a plurality of pixels between which block boundary 404 is sandwiched, and may detect the plurality of pixels as block noise 406 when there is no correlation between the signal components of the plurality of pixels.

When the level of the extracted signal component of the edge is larger than a certain threshold, and the level of the signal components extracted from the peripheral pixels by the HPF of the spatial direction is lower than another threshold, it can be also determined that block noise 406 occurs. These thresholds need to be set in response to the encoding bit rate and image contents. Continuity related to the level difference between longitudinal and lateral pixels on the image is calculated, for example. When discontinuity is resulted, it can be determined that block noise 406 occurs. When boundary information between the blocks of the video signal can be detected by a decoder, the boundary information is input to encoding noise detection unit 203.

Encoding noise detection unit 203 may determine occurrence of block noise 406 based on the continuity of flatness. In other words, variation in signal level is small in the flat part and the extracted component by the HPF is little, so that encoding noise detection unit 203 can detect the signal level difference caused by block noise 406.

Encoding noise detection unit 203, even when the boundary information is not input from the decoder, can detect some block noise 406 from the video signal. For example, the HPF extracted components may be accumulated in the spatial direction (horizontal or vertical direction), and block boundaries 404 may be estimated based on the distribution. This is because, in the MPEG2 system, block boundaries 404 are fixed horizontally and vertically and hence the accumulated value of the HPF extracted components often periodically-repeatedly increases and decreases in response to the positions of block boundaries 404 (the accumulated value is large at boundary positions). Therefore, encoding noise detection unit 203 can specify block boundaries 404 by the above-mentioned method.

In the case of the H.264 system, the block size is variable, but often varies by four pixels or eight pixels. Therefore, encoding noise detection unit 203 can specify block boundaries 404 by determination considering the fact. In addition, block boundaries 404 can be estimated by similarly expanding the determination result of the continuity of the flatness in the horizontal and vertical directions.

When ringing noise 412 is detected, a detecting method from a video signal includes the following steps, for example:
firstly extracting a high-frequency band component from right-eye video signal 201R and left-eye video signal 201L with the HPF; and
detecting, as a large-amplitude edge, a pixel where the level of the high-frequency band component is equal to a first predetermined value or higher.

Here, the first predetermined value needs to be set in response to the encoding bit rate and image contents, for example. Encoding noise detection unit 203 further extracts a component having a specific band from pixels near the large-amplitude edge with the BPF. When the level of the extracted specific band component is equal to a second predetermined value or higher, these pixels may be detected as ringing noise 412. This is because ringing noise 412 is often variation of low or intermediate level occurring in a part of high flatness near the large-amplitude edge. The second predetermined value can be changed in response to the encoding bit rate and the large-amplitude edge level of right-eye video signal 201R and left-eye video signal 201L. The second predetermined value can be also set appropriately from scene or category of right-eye video signal 201R and left-eye video signal 201L.

Ringing noise 412 occurs only in the same encoding processing block as the large-amplitude edge. Therefore, when block boundaries for defining the processing blocks are previously recognized, the detection accuracy of ringing noise 412 can be improved by determining whether it exists in the same block as the detected large-amplitude edge. Using such a method, block noise 406 and ringing noise 412 in right-eye video signal 201R and left-eye video signal 201L are detected.

Encoding noise detection unit 203 of the present embodiment further outputs an encoding noise detection signal 212 corrected by using a detection result of the detected encoding noise based on parallax detection signal 210 detected by parallax detection unit 202, in addition to performing the above-mentioned operation. In order to perform such operation, encoding noise detection unit 203 determines a pixel position of the other video signal corresponding to a target pixel in one of right-eye video signal 201R and left-eye video signal 201L based on parallax detection signal 210 output from parallax detection unit 202. Encoding noise detection unit 203 refers to the corresponding pixel at this pixel position, and corrects the target pixel. Operation of encoding noise detection unit 203 is hereinafter described in detail.

Figure 4:
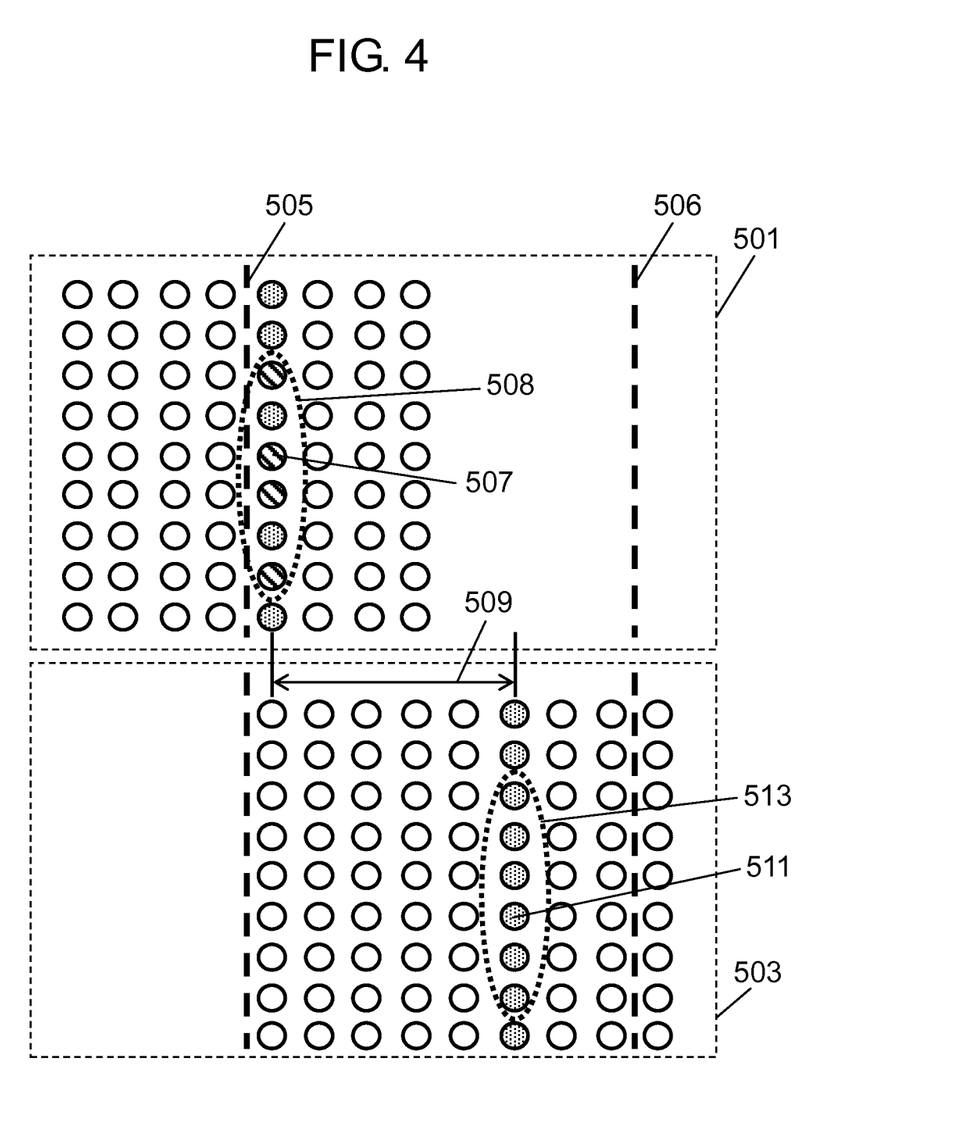
FIG. 4 is a diagram showing a detection result of the block noise in accordance with the exemplary embodiment of the present invention.

FIG. 4 is a diagram showing an example of the detection result of block noise 406 in accordance with the exemplary embodiment. FIG. 4 shows right-eye video 501 and left-eye video 503 together with block boundaries 505 and 506 and parallax amount 509. In this example, parallax amount 509 is set to be five pixels. As shown in FIG. 4, for example, target pixel 507 is set as a pixel undergoing block noise 406 on block boundary 505 of right-eye video 501. In other words, in FIG. 4, the pixels undergoing block noise 406 are expressed by oblique lines. Therefore, the pixel of left-eye video 503 existing at a position that corresponds to target pixel 507 undergoing block noise 406 and is shifted by parallax amount 509 becomes corresponding pixel 511. Corresponding pixel 511 exists at the position shifted right from target pixel 507 by five pixels. In this example, block noise 406 does not occur in corresponding pixel 511 as shown in FIG. 4. The detection result of block noise 406 can be therefore corrected based on the detection result of target pixel 507 and corresponding pixel 511.

The correction of the detection result of block noise 406 by encoding noise detection unit 203 is hereinafter described in detail.

The case where block boundaries 505 and 506 are previously recognized is described. This case includes a case where boundary information is input from the decoder. In this case, the following correcting method is considered. When the detection results of both of target pixel 507 of right-eye video 501 and corresponding pixel 511 of left-eye video 503 are "presence of noise", and when target pixel 507 and corresponding pixel 511 exist on block boundaries 505 and 506, encoding noise detection unit 203 enables the detection results. Here, the latter condition indicates that parallax amount 509 is equal to the number of component pixels of a block (eight pixels for MPEG2) or integral multiple thereof. When at least one of target pixel 507 and corresponding pixel 511 does not exist on block boundary 505 and block boundary 506, encoding noise detection unit 203 determines there is a possibility of false detection, disables both detection results, and determines "absence of noise". When the detection results of both of target pixel 507 and corresponding pixel 511 are "absence of noise", encoding noise detection unit 203 enables both detection results as they are, and determines "absence of noise". When the detection result of one of target pixel 507 and corresponding pixel 511 is "presence of noise" and the other is "absence of noise", encoding noise detection unit 203 enables both detection results as they are if the pixels of "presence of noise" exist on block boundaries 505 and 506, or disables the detection results and determines that both detection results are "absence of noise" if the pixels of "presence of noise" do not exist on block boundaries 505 and 506. Such correction can suppress occurrence of false detection.

The detection accuracy of block noise 406 may be increased using the detection results of a plurality of pixels 508 that are longitudinally arranged along block boundary 505. Of the detection results of pixels 508 continuously arranged about target pixel 507, for example, a more frequently appearing detection result may be used as the detection result of target pixel 507 to perform correcting processing. After the correction, the final detection result may include the corrected result of pixels 508.

Correction when block boundaries 505 and 506 are not previously recognized is described. For example, the following correcting method is considered. When the detection results of both target pixel 507 and corresponding pixel 511 are "absence of noise", encoding noise detection unit 203 enables both detection results as they are and determines "absence of noise". When the detection result of one of target pixel 507 and corresponding pixel 511 is "presence of noise" and the other is "absence of noise", encoding noise detection unit 203 determines that the pixel of "absence of noise" is separated from the block boundary by the parallax, and enables both detection results as they are. When the detection results of both target pixel 507 and corresponding pixel 511 are "presence of noise", encoding noise detection unit 203 may determine that parallax amount 509 is equal to the number of component pixels of the block (eight pixels for MPEG2) or integral multiple thereof, and may enable the detection results of both pixels as they are.

Encoding noise detection unit 203 may determine that both detection results indicate no block noise 406 but a pattern (picture) matching with noise detection, namely determine false detection, may disable both right and left detection results, and may correct them to "absence of noise". Encoding noise detection unit 203 considers the detection results of the plurality of continuously arranged pixels 508, may determine existence of noise when the detection results of "presence of noise" are continuously arranged both in right-eye video 501 and left-eye video 503, and may enable the detection result of target pixel 507 as it is. When block boundaries 505 and 506 extend in the longitudinal direction as in this example, encoding noise detection unit 203 can be applied to the plurality of pixels 508 arranged longitudinally. However, when the boundaries extend in the lateral direction, encoding noise detection unit 203 can be applied to a plurality of pixels arranged laterally. When the detection result of "absence of noise" sometimes exists both in right-eye video 501 and left-eye video 503, encoding noise detection unit 203 may determine false detection, may disable the detection result, and may correct the detection result of target pixel 507 to "absence of noise". Also when block boundaries 505 and 506 are not previously recognized, detection accuracy of block noise 406 can be improved by considering the detection results of a plurality of peripheral pixels.

Figure 5:
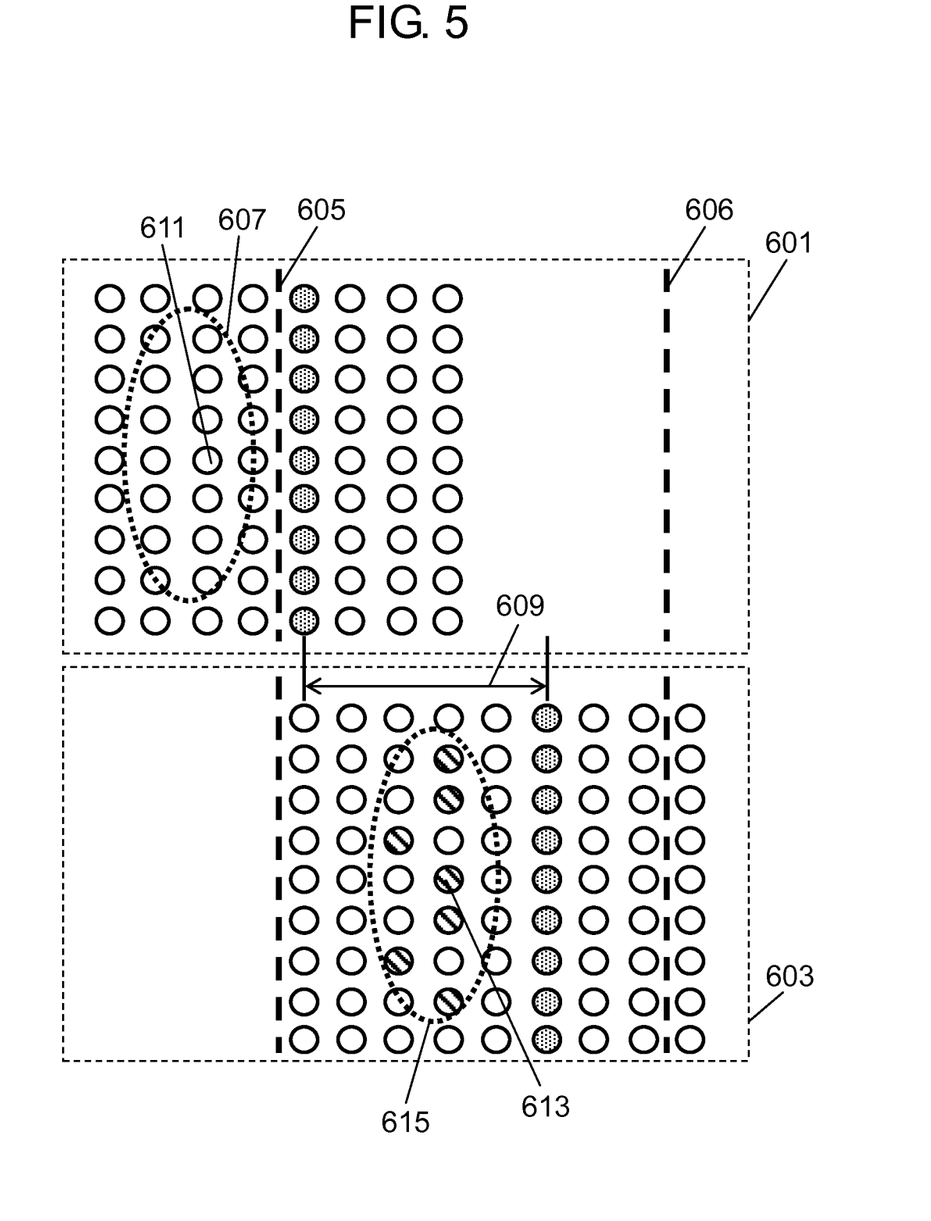
FIG. 5 is a diagram showing a detection result of the ringing noise in accordance with the exemplary embodiment of the present invention.

A similar correction for ringing noise 412 is allowed. FIG. 5 is a diagram showing an example of the detection result of ringing noise 412 in accordance with the exemplary embodiment of the present invention. FIG. 5 shows right-eye video 601 and left-eye video 603 together with boundaries 605 and 606 and parallax amount 609. Also in this example, parallax amount 609 is set as five pixels. Since parallax amount 609 between right-eye video 601 and left-eye video 603 is five pixels in FIG. 5, for example, corresponding pixel 613 in left-eye video 603 that corresponds to target pixel 611 in right-eye video 601 is shifted from target pixel 611 to the right by five pixels. In left-eye video 603, ringing noise 412 caused by the edge of the longitudinal line (black circle in FIG. 5) in the block occurs in a plurality of pixels 615 (circle including oblique lines in FIG. 5) on the left side. In right-eye video 601, however, the longitudinal lines exist in different blocks due to the parallax and hence ringing noise 412 is assumed not to be generated in a plurality of pixels 607 that correspond to ringing noise 412 of left-eye video 603.

The detection result of ringing noise 412 can be also corrected using parallax information as follows, for example. When the detection results of both target pixel 611 and corresponding pixel 613 are "absence of noise", both detection results are enabled as they are and "absence of noise" is determined. When the detection result of one of target pixel 611 and corresponding pixel 613 is "presence of noise" and the other is "absence of noise", both detection results can be enabled as they are. When block boundaries 605 and 606 are previously recognized, it is determined whether a pixel undergoing ringing noise 412 and a pixel of a large-amplitude edge, which exists near the former pixel as a cause of the noise generation, exist in different blocks ("absence of noise") or exist in the same block ("presence of noise"). When at least one determination result does not match with the detection result, both detection results are disabled, and "absence of noise" can be determined. When the detection results of both target pixel 611 and corresponding pixel 613 are "presence of noise", both detection results may be enabled as they are. When block boundaries 605 and 606 are previously recognized, it is determined whether a noise pixel and a pixel of the large-amplitude edge, which exists near the former pixel as a cause of the noise generation, exist in different blocks ("absence of noise") or exist in the same block ("presence of noise"). When at least one determination result does not match with the detection result, both detection results are disabled, and "absence of noise" can be determined.

Similarly to the block noise detection, a final detection result can be obtained from the distribution state of the detection results of the periphery. Ringing noise 412 often occurs in target pixel 611, corresponding pixel 613, and their peripheral pixels, so that the final detection result can be corrected based on the number of peripheral pixels determined to have noise.

The detection result is thus corrected using the detection result of the encoding noise in target pixel 611 and corresponding pixel 613 that are shifted from each other by parallax amount 609 in right-eye video 601 and left-eye video 603, or in a plurality of peripheral pixels 607 and 615 including these two pixels. Thus, this correction can make the detection accuracy of ringing noise 412 higher than that in detection from only one vide signal.

Based on encoding noise detection signal 212 detected by encoding noise detection unit 203, encoding noise removing unit 204 removes block noise 406 and ringing noise 412, and outputs right-eye video signal 205R and left-eye video signal 205L. Encoding noise removing unit 204 of the present embodiment, based on encoding noise detection signal 212, applies filtering processing only to a noise part, thereby reducing the noise only in the noise part. In other words, encoding noise detection signal 212 accurately indicates the noise part of input right-eye video signal 205R and left-eye video signal 205L, so that blur or the like of a picture by filtering processing for noise reduction can be reduced.

In addition to the above-mentioned method, encoding noise removing unit 204 can reduce the noise by, using parallax detection signal 210 from parallax detection unit 202, replacing the data of the noise generating pixels in right-eye video 501 or 601 and left-eye video 503 or 603 with the data of the corresponding pixel of the other video. Here, the corresponding pixel is shifted by parallax amount 509 or 609 and contains no noise. The reason why this method is used is as follows. The pair of right-eye video 501 or 601 and left-eye video 503 or 603 often has the same picture pattern. When there is parallax, encoding processing blocks are different from each other even if the patterns are the same. Therefore, occurring parts of block noise 406 and ringing noise 412 are different from each other.

Next, the noise removing processing performed by replacing the pixel data of right-eye video 501 or 601 and the pixel data left-eye video 503 or 603 with each other is specifically described. The detection results of target pixel 507 or 611 and corresponding pixel 511 or 613 by encoding noise detection unit 203 are recognized. Here, target pixel 507 or 611 exists in the video signal of one of right-eye video 501 or 601 and left-eye video 503 or 603. Corresponding pixel 511 or 613 exists in the video signal of the other that corresponds to target pixel 507 or 611 and is shifted from them by parallax amount 509 or 609 detected by parallax detection unit 202. When the detection results of both pixels are "absence of noise", there is no noise and hence noise removing processing is not performed. When the detection results of both pixels are "presence of noise", noise exists in the video signals of both right-eye video 501 or 601 and left-eye video 503 or 603, and hence the noise cannot be removed even when the pixel data of right-eye video 501 or 601 and the pixel data of left-eye video 503 or 603 are replaced with each other. In this case, noise is therefore reduced by filtering processing. When the detection result of one of right-eye video 501 or 601 and left-eye video 503 or 603 is "presence of noise" and the other is "absence of noise", the data of the pixel which is determined as "presence of noise" is replaced with the data of the pixel in the other video, shifted by parallax amount 509 or 609, as it is.

In FIG. 4, for example, block noise 406 is detected in a block boundary 505 part in right-eye video 501 (circle including oblique lines in FIG. 4), but block noise 406 is not detected in the corresponding part in left-eye video 503 shifted by parallax amount 509. Therefore, the pixel data (black circle) of left-eye video 503 is replaced with the pixel data undergoing block noise 406 of right-eye video 501. This data replacing method can reduce noise.

At this time, the data after the replacing processing may pass through spatial LPF, thereby an unnecessary band component generated by replacing processing can be reduced. Not only corresponding data segments shifted from each other by parallax amount 509 are replaced with each other, but also replacing processing can be performed using data of a plurality of pixels 513 around them.

Variation in signal level is often small between peripheral pixels in the occurring parts of block noise 406 and ringing noise 412, so that the replacing processing can be performed using, instead of the target pixel, the peripheral data segments or data acquired by averaging them. Such noise reducing processing can reduce a problem such as blurring of the picture due to the filtering processing.

Figure 6:
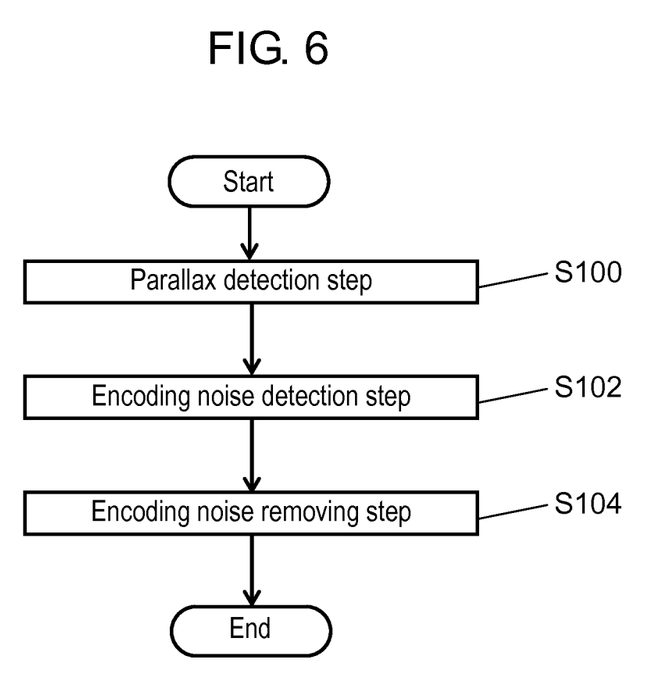
FIG. 6 is a flowchart showing flow of the video signal processing in the video signal processing device in accordance with the exemplary embodiment of the present invention.

Next, the video signal processing method performed by the video signal processing device of the present exemplary embodiment is described using a flowchart shown in FIG. 6. FIG. 6 is a flowchart showing flow of the video signal processing in the video signal processing device in accordance with the exemplary embodiment of the present invention. The video signal processing method of the video signal processing device has parallax detection step S100, encoding noise detection step S102, and encoding noise removing step S104, in a stereoscopic image display device for displaying a stereoscopic image with right-eye video signal 201R and left-eye video signal 201L having parallax.

In parallax detection step S100, parallax detection unit 202 detects the parallax from right-eye video signal 201R and left-eye video signal 201L that are acquired by decoding a video signal encoded such as the MPEG2 encoding system or MPEG4-AVC/H.264 encoding system, and outputs the detected parallax as a parallax detection signal 210. In order to detect the parallax, in parallax detection step S100, parallax detection unit 202 acquires the difference of target pixel 507 or 611 of right-eye video signal 201R, for example, from the pixel existing at the same position of left-eye video signal 201L and pixels around it. Then, in parallax detection step S100, the pixel where the absolute value of the difference is the smallest is determined as a correlation pixel, namely the pixel shifted by parallax amount 509 or 609 by parallax detection unit 202. In parallax detection step S100, parallax detection unit 202 outputs, as parallax detection signal 210, the direction and distance between target pixel 507 or 611 and the pixels shifted by parallax amount 509 or 609.

In encoding noise detection step S102, encoding noise detection unit 203 detects an encoding noise generated by encoding processing from right-eye video signal 201R and left-eye video signal 201L, and corrects the detected encoding noise based on parallax detection signal 210. Encoding noise detection signal 212 is generated from the corrected encoding noise, and is output. Specifically, encoding noise detection unit 203 extracts signal components in an edge (contour) with the HPF of the spatial direction, for example. The edge is compared with the signal components extracted from the peripheral pixels of block boundary 404 by the HPF of the spatial direction, and the level difference between the signal components is compared with a threshold. When the level difference is larger than the threshold, it is determined that there is no correlation between the signal components. Here, the threshold needs to be set in response to the encoding bit rate and image contents. When there is no correlation between the signal components, as discussed above, it is determined that the image is discontinuous and block noise 406 occurs.

In order to correct the detected encoding noise, based on parallax detection signal 210 output from parallax detection unit 202, encoding noise detection unit 203 determines the pixel position of the other video signal that corresponds to the target pixel in one of right-eye video signal 201R and left-eye video signal 201L. Encoding noise detection unit 203 refers to the corresponding pixel at this pixel position and corrects the target pixel.

In encoding noise removing step S104, encoding noise removing unit 204 performs at least one of the following processes:

reducing the encoding noise from the right-eye video signal and left-eye video signal by the filtering processing using encoding noise detection signal 212; and reducing, based on parallax detection signal 210, the encoding noise by replacing the data of a noise generating pixel in right-eye video signal 201R and left-eye video signal 201L with the corresponding pixel data in the other video that shifts by the parallax and contains no noise.

Thus, encoding noise removing unit 204 can remove the noise by applying the filtering processing to only the noise part based on encoding noise detection signal 212. In other words, encoding noise detection signal 212 accurately indicates the noise part of input right-eye video signal 205R and left-eye video signal 205L, so that blurring of a picture by the filtering processing for noise reduction can be reduced.

The reason why the encoding noise can be reduced by replacing the pixel data is that a pair of right-eye video and left-eye video often has the same picture pattern. Further, when there is a parallax, encoding processing blocks are different from each other even when the videos have the same pattern. The generating parts of block noise 406 and ringing noise 412 are different from each other. Therefore, the filtering processing for noise reduction is not used, so that the picture is not blurred by the filtering processing for noise reduction. The noise reducing effect can be further improved by the filtering processing.

INDUSTRIAL APPLICABILITY

The present invention is related to video signal processing that uses parallax between right-eye video and left-eye video when three-dimensional stereoscopic display is performed to allow reduction of an encoding noise generated by encoding processing such as the MPEG2 or H.264.

REFERENCE MARKS IN THE DRAWINGS 201 video signal input terminal
201L left-eye video signal
201R right-eye video signal
202 parallax detection unit
203 encoding noise detection unit
204 encoding noise removing unit
205 video signal output terminal
205L left-eye video signal
205R right-eye video signal
210 parallax detection signal
212 encoding noise detection signal
301 right-eye video
303 left-eye video
305 display video
401 right-eye video
403 block noise generating region
404 block boundary
406 block noise
407 left-eye video
409 ringing noise generating region
410 block boundary
412 ringing noise
501 right-eye video
503 left-eye video
505 block boundary
506 block boundary
507 target pixel
508 a plurality of pixels
509 parallax amount
511 corresponding pixel
513 a plurality of pixels
601 right-eye video
603 left-eye video
605 block boundary
606 block boundary
607 a plurality of pixels
609 parallax amount
611 target pixel
613 corresponding pixel
615 a plurality of pixels

The invention claimed is:

1. A video signal processing device in a stereoscopic image display device for displaying a stereoscopic image with a right-eye video signal and a left-eye video signal that have a parallax and that have different encoding processing blocks from each other, the video signal processing device comprising:
    an encoding noise detection unit for detecting encoding noises that are generated from at least one of the right-eye video signal and the left-eye video signal by encoding processing, and outputting a corrected encoding noise detection signal based on a parallax from right-eye video included in the right-eye video signal and a left-eye video included in the left-eye video signal; and
    an encoding noise removing unit for:
    when the encoding noises are detected as being generated from both the right-eye video signal and the left-eye video signal, reducing the encoding noises from both the right-eye video signal and the left-eye video signal performing a filtering process using the encoding noise detection signal; and
    when the encoding noises are detected as being generated from only one of the right-eye video signal and the left-eye video signal, reducing, based on the parallax, the encoding noises by replacing data of a noise generating pixel in the one of the right-eye video signal and the left-eye video signal from which the encoding noises are detected with corresponding pixel data, in the other of the right-eye video signal and the left-eye video signal from which the encoding noises are not detected, that is shifted by the parallax and contains no noise,
    wherein the encoding noise detecting unit extracts signal components between a plurality of pixels with a high pass filter of a spatial direction, and, when there is no correlation between the signal components of the plurality of pixels, the encoding noise detection unit detects a plurality of pixels with no correlation as a block noise, a block boundary being between the plurality of pixels.

2. The video signal processing device of claim 1, wherein, when at least one of an edge, flatness, and signal level of a picture is discontinuous between a plurality of pixels, the encoding noise detection unit detects a plurality of discontinuous pixels as a block noise, a block boundary being between the plurality of pixels.

3. The video signal processing device of claim 1, wherein the encoding noise detection unit extracts a first pixel where a level of a high-frequency band component in the right-eye video signal and the left-eye video signal is equal to a first predetermined value or higher, and
    when a level of a specific band component of a second pixel near the first pixel is equal to a second predetermined value or higher, the encoding noise detection unit determines the first pixel as a ringing noise.

4. The video signal processing device of claim 1, wherein only when a first pixel where a high-frequency band component is equal to a first predetermined value or higher and a second pixel that exists near the first pixel and where a specific band component is equal to a second predetermined value or higher exist in an identical encoding processing block, the encoding noise detection unit determines the first pixel as a ringing noise.

5. A video signal processing method in a stereoscopic image display device for displaying a stereoscopic image with a right-eye video signal and a left-eye video signal that have a parallax and that have different encoding processing blocks from each other, the video signal processing method comprising:
    an encoding noise detection, step, using an encoding noise detection unit, of detecting encoding noises that are generated from at least one of the right-eye video signal and the left-eye video signal by encoding processing, and outputting a corrected encoding noise detection signal based on a parallax from a right-eye video included in the right-eye video signal and a left-eye video included in the left-eye video signal; and
    an encoding noise removing step, using an encoding noise removing unit, of:
    when the encoding noises are detected as being generated from both the right-eye video signal and the left-eye video signal, reducing the encoding noises from both the right-eye video signal and the left-eye video signal by performing a filtering process using the encoding noise detection signal; and when the encoding noises are detected as being generated from only one of the right-eye video signal and the left-eye signal, reducing, based on the parallax, the encoding noises by replacing data of a noise generating pixel in the one of the right-eye video signal and the left-eye video signal from which the encoding noises are detected with corresponding pixel data, in the other of the right-eye video signal and the left-eye video signal from which the encoding noises are not detected, that is shifted by the parallax and contains no noise, wherein the encoding noise detection step extracts signal components between a plurality of pixels with a high pass filter of a spatial direction, and, when there is no correlation between the signal components of the plurality of pixels, detects a plurality of pixels with no correlation as a block noise, a block boundary being between the plurality of pixels.

6. The video signal processing method of claim 5, wherein, when at least one of an edge, flatness, and signal level of a picture is discontinuous between a plurality of pixels, the encoding noise detection step detects a plurality of discontinuous pixels as a block noise, a block boundary being between the plurality of pixels.

7. The video signal processing method of claim 5, wherein the encoding noise detection step extracts a first pixel where a level of a high-frequency band component in the right-eye video signal and the left-eye video signal is equal to a first predetermined value or higher, and, when a level of a specific band component of a second pixel near the first pixel is equal to a second predetermined value or higher, determines the first pixel as a ringing noise.

8. The video signal processing method of claim 5, wherein only when a first pixel where a high-frequency band component is equal to a first predetermined value or higher and a second pixel that exists near the first pixel and where a specific band component is equal to a second predetermined value or higher exist in an identical encoding processing block, the encoding noise detection step determines the first pixel as a ringing noise.

9. The video signal processing device of claim 1, further comprising a parallax detection unit for detecting the parallax from the right-eye video signal and the left-eye video signal that are acquired by decoding an encoded video signal, and for outputting the detected parallax as a parallax detection signal, wherein the encoding noise detection unit detects the encoding noises that are generated from at least one of the right-eye video signal and the left-eye video signal by encoding processing, and outputs the corrected encoding noise detection signal based on the parallax detection signal, and wherein the encoding noise removing unit performs:
when the encoding noises are detected as being generated from both the right-eye video signal and the left-eye video signal, reducing the encoding noises from both of the right-eye video signal and the left-eye video signal by performing the filtering process using the encoding noise detection signal; and when the encoding noises are detected as being generated from only one of the right-eye video signal and the left-eye video signal, reducing, based on the parallax detection signal, the encoding noises by replacing the data of the noise generating pixel in the one of the right-eye video signal and the left-eye video signal with the corresponding pixel data, in the other of the right-eye video signal and the left-eye video signal from which the encoding noises are not detected, that is shifted by the parallax and contains no noise.

10. The video signal processing method of claim 5, further comprising a parallax detection step of detecting the parallax from the right-eye video signal and the left-eye video signal that are acquired by decoding an encoded video signal, and of outputting the detected parallax as a parallax detection signal, wherein, in the encoding noise detection step, the encoding noise detection unit detects the encoding noises that are generated from the right-eye video signal and the left-eye video signal by encoding processing, and outputs the corrected encoding noise detection signal based on the parallax detection signal, and wherein, in the encoding noise removing step, the encoding noise removing unit performs:
when the encoding noises are detected as being generated from both the right-eye video signal and the left-eye video signal, reducing the encoding noises from both of the right-eye video signal and the left-eye video signal by performing the filtering process using the encoding noise detection signal; and when the encoding noises are detected as being generated from only one of the right-eye video signal and the left-eye video signal, reducing, based on the parallax detection signal, the encoding noises by replacing the data of the noise generating pixel in the one of the right-eye video signal and the left-eye video signal with the corresponding pixel data, in the other of the right-eye video signal and the left-eye video signal from which the encoding noises are not detected, that is shifted by the parallax and contains no noise.

* * * * *